(12) United States Patent  (10) Patent No.: US 7,891,436 B2
Cruson  (45) Date of Patent: Feb. 22, 2011

(54) FURROW OPENER WITH REPLACEABLE ELONGATE TIP BODY

(76) Inventor: Brian Cruson, 36042 Auguston Parkway South, Abbottsford, British Columbia (CA) V3G 3G1

( * ) Notice: Subject to any disclaimer, the term of this patent is extended or adjusted under 35 U.S.C. 154(b) by 18 days.

(21) Appl. No.: 12/339,923

(22) Filed: Dec. 19, 2008

(65) Prior Publication Data

US 2010/0155091 A1 Jun. 24, 2010

(51) Int. Cl.
 *A01B 39/20* (2006.01)
(52) U.S. Cl. .................. 172/753; 172/772; 111/156
(58) Field of Classification Search ............. 172/772, 172/753, 769; 111/109, 124, 125, 149, 150, 111/152, 154, 156, 170
See application file for complete search history.

(56) References Cited

U.S. PATENT DOCUMENTS

| | | | | |
|---|---|---|---|---|
| 381,465 | A * | 4/1888 | Crane ........................ | 111/150 |
| 2,034,461 | A * | 3/1936 | Daughtery ................. | 172/731 |
| 2,834,446 | A * | 5/1958 | Wade ........................... | 193/9 |
| 2,988,026 | A * | 6/1961 | Heckathorn ................ | 111/150 |
| 3,001,591 | A * | 9/1961 | Johnson ..................... | 172/700 |
| 3,254,727 | A * | 6/1966 | Helton et al. ............... | 172/719 |
| 3,259,087 | A * | 7/1966 | Horton ....................... | 111/123 |
| 3,536,147 | A * | 10/1970 | Olson et al. ................ | 172/719 |
| 3,704,753 | A * | 12/1972 | Hasforth et al. ............ | 172/700 |
| 3,919,951 | A * | 11/1975 | Williams et al. ............ | 111/123 |
| 3,999,614 | A * | 12/1976 | Rhoads ....................... | 172/719 |
| 4,607,581 | A * | 8/1986 | Kopecky .................... | 111/152 |
| 4,669,922 | A * | 6/1987 | Hooper et al. .............. | 406/157 |
| 4,765,263 | A * | 8/1988 | Wilkins ...................... | 111/187 |
| 4,770,112 | A * | 9/1988 | Neumeyer ................... | 111/73 |
| 4,799,823 | A * | 1/1989 | Williams .................... | 405/180 |
| 4,932,478 | A * | 6/1990 | Jones .......................... | 172/699 |
| 5,025,736 | A * | 6/1991 | Anderson ................... | 111/152 |
| 5,314,029 | A * | 5/1994 | Rowlett ...................... | 172/699 |
| 5,333,696 | A * | 8/1994 | Cornelius ................... | 172/772 |
| 5,350,022 | A * | 9/1994 | Launder et al. ............. | 172/700 |
| 6,059,047 | A * | 5/2000 | Schimke ..................... | 172/769 |
| 6,178,900 | B1 * | 1/2001 | Dietrich, Sr. ............... | 111/119 |
| 6,397,767 | B1 * | 6/2002 | Dietrich, Sr. ............... | 111/119 |
| 6,457,426 | B1 * | 10/2002 | Cruson ....................... | 111/154 |
| 7,096,803 | B2 * | 8/2006 | Bergen ....................... | 111/124 |

FOREIGN PATENT DOCUMENTS

CA 2326468 4/2005

* cited by examiner

*Primary Examiner*—Robert E Pezzuto
*Assistant Examiner*—Jamie L McGowan
(74) *Attorney, Agent, or Firm*—Ryan W. Dupuis; Kyle R. Satterthwaite; Ade & Company Inc (57) ABSTRACT

A furrow opener comprises an opener body including a shank mount arranged to support the opener body on an agricultural implement shank for movement in a forward working direction and a tip body readily separable from the opener body and arranged for forming a furrow in the ground in the working direction. The tip body includes a furrowing portion extending downwardly and forwardly beyond the opener body so as to be arranged to form the furrow in the ground. A retainer member is supported on the opener body to retain a portion of the tip body adjacent the top end thereof on the opener body to provide support to the tip body against a moment acting on the tip body from the rearward force on the furrowing portion during furrow formation.

20 Claims, 7 Drawing Sheets

FURROW OPENER WITH REPLACEABLE ELONGATE TIP BODY

FIELD OF THE INVENTION

The present invention relates to a ground engaging furrow opener comprising an opener body arranged to be supported on an agricultural implement shank for movement therewith in a forward working direction and an elongate tip body which is arranged to be supported in an upright orientation along a front side of the opener body such that the tip body is readily separable from the opener body for selective replacement thereof.

BACKGROUND

Furrow openers are commonly attached onto implement shanks of an agricultural cultivator to form furrows in the ground for planting seed or depositing fertilizer and the like. One example of a furrow opener is described in Canadian patent 2,326,468 by Cruson. As described an opener body is supported on the implement shank by various releasable connecting means. A replaceable tip is mounted on the forward bottom end of the opener body which is pointed for forming a furrow in the ground as the opener is displaced in the forward working direction of the agricultural cultivator. As is typical with the mounting of a replaceable tip on an opener body, the opener body includes a downward and forward projection received within a socket of the tip with the tip being retained by a transverse pin extending through cooperating apertures in the tip and the opener body. The tip typically comprises harder and more wear resistant material than the opener body and is supported to extend downwardly below the opener body to protect the opener body.

As the opener is displaced through the ground for forming a furrow in the forward working direction, the forces of the ground against which the tip is displaced causes a large moment to be applied to the tip body relative to the opener body upon which it is supported so that a top end of the tip body is effectively pulled forwardly as the ground pushes rearwardly on the bottom end of the tip body. On larger tip bodies, this can place a considerable stress on the pin connection between the tip body and the opener body. Furthermore at the top end of the tip body, where the tip body is pulled away from the opener body, the opener body can be subject to wear and debris can be trapped between the opener body and the tip body.

SUMMARY OF THE INVENTION

According to one aspect of the invention there is provided a furrow opener for mounting on an agricultural implement shank for movement therewith in a forward working direction, the furrow opener comprising:

an opener body including a shank mount arranged to support the opener body on the implement shank;

a tip body comprising:

a rear connecting portion at a rear side of the tip body coupling the tip body to the opener body adjacent a bottom end of the opener body so as to be arranged for ready separation of the tip body from the opener body;

a furrowing portion extending downwardly and forwardly from the connecting portion beyond the bottom end of the opener body so as to be arranged to form a furrow in the ground; and a guard portion extending upwardly from the furrowing portion along a front side of the opener body; and a retainer member supported on the opener body adjacent a top end of the tip body such that a portion of the tip body above the rear connecting portion is arranged to be received between the retainer member and the opener body adjacent the top end of the tip body.

Providing a retainer member adjacent the top end of the tip body which is spaced above the usual socket and pin connection adjacent the bottom end of the opener body ensures that an elongate tip body is adequately supported against the moments applied to the tip body by the ground pushing rearwardly on the bottom end of the tip during furrow formation. The retainer member ensures that the top end of the tip body is held securely against the opener body to minimize twisting forces applied to the connection between the tip body and the opener body adjacent the bottom end of the opener body and to prevent access of debris between the top end of the tip body and the opener body to minimize wear on the opener body as compared to prior art configurations.

The retainer member is preferably spaced upwardly above the furrowing portion of the tip body.

The retainer member may overlap a front face of the tip body by extending downwardly over the top end of the tip body.

Preferably the retainer member is formed integrally with the opener body.

The retainer member may extend downwardly and rearwardly in a region of overlapping and mating engagement over the front face of the portion of the tip body which is overlapped by the retainer member.

When the opener body includes a forward connecting portion arranged for releasable connection to the rear connecting portion of the tip body, one of the connecting portions preferably comprises a socket and the other one of the connecting portions comprising a protrusion matingly received within the socket which are independent of the retainer on the opener body. In the first illustrated embodiment, the rear connecting portion of the tip body comprises the socket and the forward connecting portion of the opener body comprises the protrusion. Also in the illustrated embodiment, there is provided a retainer pin extending transversely to the forward working direction through co-operating apertures in the socket of the tip body and the protrusion of the opener body. In this instance, the retainer member is spaced upwardly above the retainer pin.

A bottom wall of the socket is may be substantially horizontal to assist in rotating the tip body into position when coupling the tip body to the retainer body.

Preferably the tip body is elongate in an upright direction such that the top end of the tip body is similar in elevation to a bottom end of the shank mount on the opener body.

The tip body may span upwardly from the bottom end of the opener body a height which corresponds to a majority of an overall height of the opener body.

There may be provided two product delivery passages extending through the opener body rearwardly from the tip body, one of the delivery passages being arranged for communication with a liquid fertilizer delivery tube and one of the delivery passages being arranged for communication with a seed delivery tube. In the illustrated embodiment, both product delivery passages extend through the opener body forwardly of the shank mount.

According to a further embodiment, when the opener body comprises a forward connecting portion at a front side thereof arranged for mating engagement with the rear connecting portion of the tip body and which comprises a pair of upright side walls supported spaced apart from one another to extend in the forward working direction, the rear connecting portion preferably includes a rearward portion of the tip body which is received between the upright side walls of the opener body. The retainer member may be located between the upright side walls of the opener body in this instance. Furthermore, the tip body may comprise a plate member arranged to be supported parallel to the forward working direction.

According to a second aspect of the present invention there is provided a method of mounting a tip body on an opener body of a furrow opener in which the opener body comprises a shank mount arranged to support the opener body on an agricultural implement shank for movement therewith in a forward working direction, and in which the tip body comprises a rear connecting portion coupling the tip body to the opener body adjacent a bottom end of the opener body, a furrowing portion extending downwardly and forwardly from the rear connecting portion beyond the bottom end of the opener body, and a guard portion extending upwardly from the furrowing portion along a front side of the opener body; the method comprising:

providing a retainer member supported on the opener body adjacent a top end of the tip body; and inserting a portion of the tip body above the rear connecting portion between the retainer member and the opener body adjacent the top end of the tip body.

When the forward connecting portion on the opener body is connected to the rear connecting portion of the tip body so as to be readily releasable and one of the connecting portions comprises a socket and the other one of the connecting portions comprises a protrusion matingly received within the socket, the method preferably includes inserting the portion of the tip body above the rear connecting portion between the retainer member and the opener body as the forward connecting portion and the rear connecting portion are mated together.

The method may further include rotating the furrowing portion downwardly and rearwardly towards a bottom end of the opener body as the portion of the tip body is inserted between the retainer member and the opener body and the forward connecting portion is mated with the rear connecting portion.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Referring to the accompanying figures there is illustrated a furrow opener generally indicated by reference numeral 10. The opener 10 is particularly suited for mounting on an implement shank 12 of an agricultural cultivator for movement therewith in a forward working direction 14 thereof.

According to a first embodiment shown in FIGS. 1 through 5, the furrow opener 10 comprises an opener body 16 which is elongate in an upright direction having a width adjacent the top end thereof which is near a width of the shank 12 and which becomes narrower than the shank 12 adjacent the bottom end thereof. The opener body includes a shank mount 18 arranged for mounting the opener body onto the implement shank so as to be readily releasable and replaceable on the shank as maybe desired. The shank mount 18 comprises a plate member having a flat bottom surface which extends at an upward and rearward incline for overlapping a corresponding front face of the shank 12 when coupled thereto. A pair of longitudinally spaced fastener apertures 20 are provided in the shank mount for alignment with corresponding fastener apertures in the shank 12 for connection of the opener body to the shank using suitable fasteners in the illustrated embodiment.

The opener body further comprises an upper portion extending forwardly from the shank mount 18 adjacent the bottom end of the shank mount and a lower portion 24 extending generally downwardly from the upper portion forwardly of the shank mount 18. The upper portion is approximately the same width in the lateral direction perpendicular to the forward working direction as the shank mount and shank 12 upon which it is supported, while the lower portion is narrower than the upper portion and shank thereabove. The lower portion 24 includes a bottom surface 26 which is inclined downwardly and forwardly substantially in alignment with a bottom face of the shank mount 18 so as to be parallel thereto. The lower portion 24 extends upwardly from the bottom side 26 to increase in width at the upper portion 22 which terminates at a top side 28 extending substantially horizontally forward from a central location on the shank mount 18. Both the upper and lower portions of the opener body extend forwardly to a common front side 30 which extends vertically the full height of the opener body 16.

The opener body 16 includes a front product delivery passage 32 and a rear product delivery passage 34 extending generally vertically therethrough between respective openings in the top side and bottom side of the opener body. The rear product delivery passage 34 is positioned forwardly of the shank mount 18 and is arranged for communicating seed delivered therethrough to be deposited from the opening in the bottom side 26 thereof. The rear passage 34 is generally circular in cross section in the upper portion 22. The width of the passage in the lateral direction becomes narrower through the lower portion of the opener body but becomes larger in dimension in the longitudinal direction or forward working direction so as to be substantially similar in overall cross sectional area throughout the height of the passage through the opener body. The discharge opening in the bottom side 26 of the opener body accordingly lies in a common plane with the bottom side to be sloped generally upwardly and rearwardly similar to the inclination of the shank upon which the opener is supported.

The front product delivery passage 32 extends vertically through the opener body in front of the rear passage 34 and the shank mount 18. The front passage 32 receives a liquid delivery tube 36 therethrough for communicating liquid fertilizer from a stem 38 at a top end of the tube 36 to a discharge opening of the tube 36 projecting from the open bottom end of the delivery passage which is downwardly and forwardly in relation to the discharge opening of the rear passage 34. The stem 38 at the top end is arranged for connection to a respective one of the liquid fertilizer delivery tubes 40 from the cultivator.

The opener body 16 further comprises a tube mounting portion 42 which extends upwardly to be continuous with the vertical front side above the top side 28 of the upper portion of the opener body. The raised tube mounting portion 42 at the front side of the opener body is forwardly of the rear product delivery passage 34 and is positioned to receive the front product delivery passage 32 therethrough. A rear side of the tube mounting portion 42 is curved about the circular opening at the top side of the rear product delivery passage 34 to partially surround and provide support to a seed tube 37 of the cultivator in communication with the rear product delivery passage.

A pair of mounting flanges 44 extend rearwardly from the tube mounting portion 42 spaced above the top side of the upper portion of the opener body generally parallel and spaced apart from one another to extend rearward by a distance corresponding approximately to the diameter of the seed tube 37 and rear product delivery passage 34. The mounting flanges 44 are suitably spaced to receive the seed tube therebetween to provide support to the seed tube. A retainer lug 46 is mounted on the front side of the tube mounting portion 42 in alignment in elevation with the mounting flanges 44 to be spaced above the top side of the upper portion of the opener body similarly to the mounting flanges 44.

When a seed tube is in communication with the rear product delivery passage 34 a suitable strap member can be received about the seed tube and the tube mounting portion 42 in vertical elevation between the mounting flanges and top side 28 of the upper portion of the opener body to fasten the seed tube to the tube mounting portion 42 of the opener body. The lug 46 extends forwardly from the mounting portion 42 above the strap to retain the strap in vertical alignment with the space between the mounting flanges and the top side of the opener body.

The stem 38 extends above the tube mounting portion 42 and the mounting flanges 44 so that when connecting an auxiliary fertilizer delivery tube 40 thereto a tube clamp can be received about the tube 40 to retain the tube on the stem 38.

A tip body 48 for forming the furrow is arranged to be supported on the front side of the opener body 16. A front connecting portion 50 is provided on the front side of the opener body which includes a projection on the front side which extends generally forwardly from the opener body for mating with a rear connecting portion 52 on the rear side of the tip body 48 which includes a socket receiving the projection therein. The front and rear connecting portions further include transverse apertures 58 formed in the tip body and opener body respectively to connect and mount the tip body to the opener body such that the tip body remains readily releasable.

The projection of the front connecting portion 50 of the opener body and the mating socket of the tip body are generally triangular in profile having a generally horizontal bottom wall 54 extending in the forward direction from the bottom end of the opener body. A front face 56 of the projection extends generally upwardly and rearwardly from the front end of the bottom wall 54 to a top end which is near in elevation to the height of the bottom end of the shank mount 18. The projection has a width in the lateral direction which is narrower than the lower portion of the opener body.

The tip body has an overall width in the lateral direction which is less than the shank mount, the shank upon which it is supported, and the upper portion of the opener body so as to be near in lateral width to the lower portion of the opener body. The socket forming the rear connecting portion 52 of the tip body is located in the rear face so that opposing vertical side walls of the tip body are substantially aligned with the side walls of the lower portion of the opener body. The socket forming the rear connecting portion 52 also includes a generally horizontal bottom wall 54 and a sloped upright wall 56 which extends upwardly and rearwardly to match the profile of the projection received therein in a mating configuration.

The transverse cooperating apertures 58 are provided through the side walls of the tip body locating the socket therein and the projection such that the apertures are aligned with one another when the projection is mated within the socket of the tip body to form a common aperture extending horizontally through the opener perpendicular to the forward direction to receive a suitable retainer pin 60 therethrough. The retainer pin 60 comprises a roll pin which is inserted through the cooperating apertures to be tightly received and thus retained therein. The pin remains readily releasable so that the mating connection between the front connecting portion of the opener body and the rear connecting portion of the tip body are readily releasable from one another.

The tip body is elongate in an upright direction between a top end which is near in elevation to a height of the bottom end of the shank mount and a bottom end such that the tip body spans a majority of the overall height of the opener body. The bottom end of the tip body defines a furrowing portion 62 extending downwardly and forwardly from the rear connecting portion beyond a bottom end of the opener body. The furrowing portion 62 spans substantially the full width of the tip body adjacent the bottom thereof at a location spaced ahead of the rear side of the tip body which locates the rear connecting portion therein so as to be located ahead of the inner terminal end of the socket forming the rear connecting portion. The rear side of the tip body stops at a bottom end substantially in alignment with the bottom end of the opener body. A member of wear resistant material 64 is located on the front bottom edge of the furrowing portion 62 so that the furrowing portion of the tip body which is adjacent the bottom end of the opener body and which extends therebelow is protected by a material which is harder and has increased wear resistance than the remainder of the tip body.

The tip body further comprises a guard portion 66 which is substantially continuous with the front side of the furrowing portion 62 to span upwardly therefrom along the front side of opener body forwardly of the rear connecting portion. The guard portion 66 spans upwardly a full height of the tip body at a rearward incline which is similar to the inclination of the front face of the front connecting portion of the opener body and the internal wall of the socket receiving the front connecting portion therein. The top end of the guard portion 66 forms the top end of the tip body which is in alignment with the bottom end of the shank mount in elevation.

The furrowing portion and the guard portion are substantially similar in width at the front side thereof as measured in a horizontal direction which is perpendicular to the forward direction. Accordingly the front side of the guard portion and the furrowing portion have a width which is less than the shank mount but which is near in width to the lower portion of the opener body. The inclination of the front side of the guard and furrowing portion is nearer to a vertical orientation than the inclination of the shank mount of the opener body.

The tip body includes an upper connecting portion 68 at the top end of the tip body and the top end of the guard portion so as to be spaced above the rear connecting portion and to be formed separately therefrom. The upper connecting portion 68 serves to be coupled to a retainer member 70 formed integrally on the opener body which is similarly spaced above and formed separately from the forward connecting portion thereon. The upper connecting portion 68 generally comprises a hook member which extends upwardly and generally forwardly from the top end of the tip body substantially a full width of the tip body in the lateral direction while being somewhat curved in profile to define a concave front face and a convex rear face of the upper connecting portion 68.

The retainer member 70 on the opener body includes a first portion 76 projecting forwardly from the front edge of the opener body spaced above the forward connecting portion. A depending portion 74 extends downwardly from the first forward projecting portion 76 of the retainer member at a location spaced forwardly from the front side of the opener body. The first portion 76 extends forwardly from the opener body at the upper portion thereof so as to be spaced above the bottom end of the shank mount in elevation. The depending portion 74 extends downwardly from the first portion 76 at a slight rearward incline to define a generally hook shaped recess between the depending portion 74 of the retainer member and the front side of the opener body to receive the upper connecting portion 68 of the tip body therein.

The retainer member is thus arranged to extend overtop of the top edge of the upper connecting portion at the top end of the tip body across a full width thereof in the lateral direction. The depending portion 74 overlaps the front face of the tip body at the top end thereof by extending downwardly and rearwardly in overlapping configuration therewith in which the profile of the recess defined between the depending portion 74 and the front side of the opener body mates with the profile of the upper connecting portion 68. The gap defined by the retainer member is thus similarly curved in profile as the upper connecting portion 68 so that the upper connecting portion is inserted in the gap between the depending portion 74 and the front side of the opener body by rotating the tip body into position.

Figure 1:
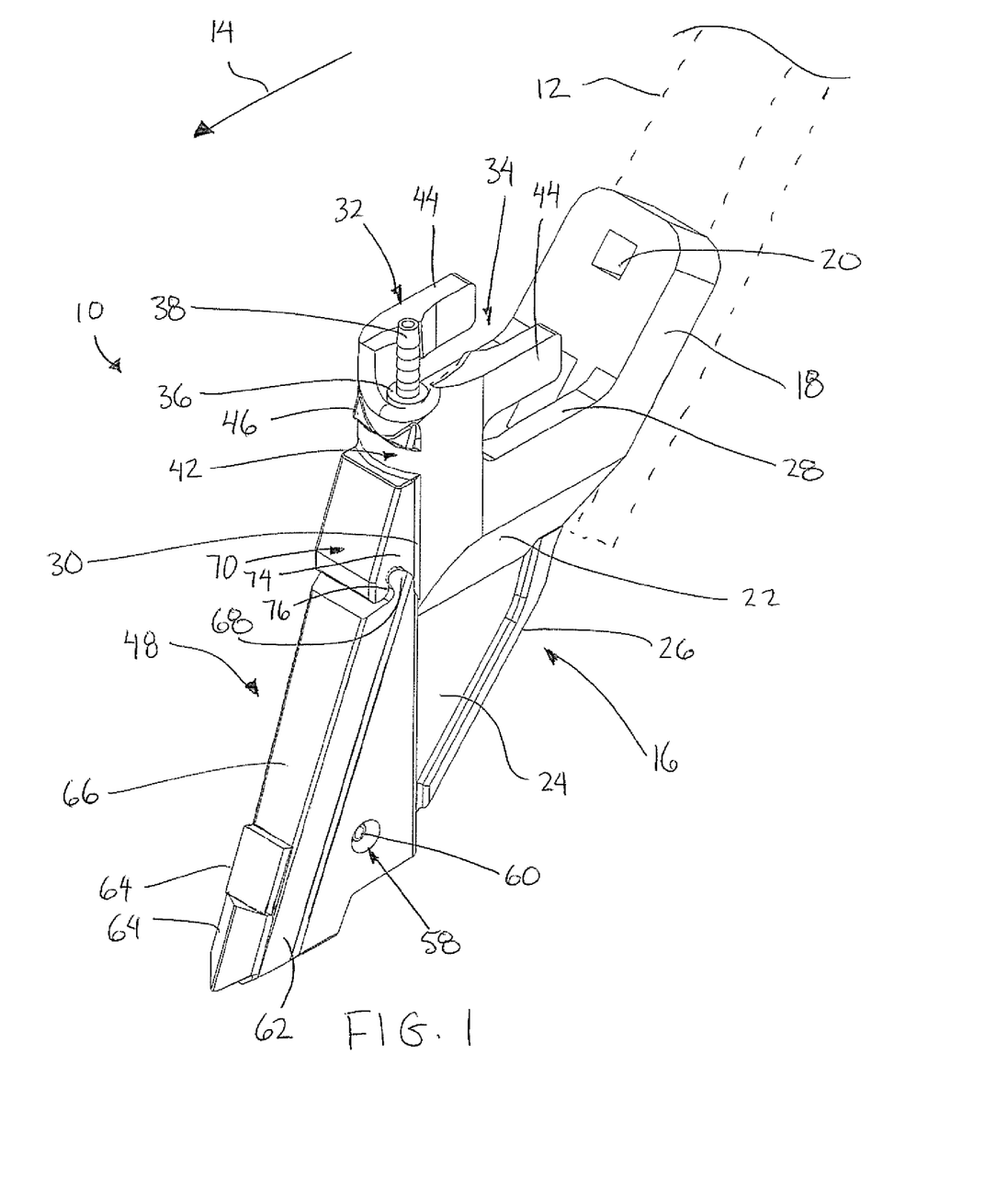
FIG. 1 is a perspective view of a front side of first embodiment of the furrow opener.
Figure 2:
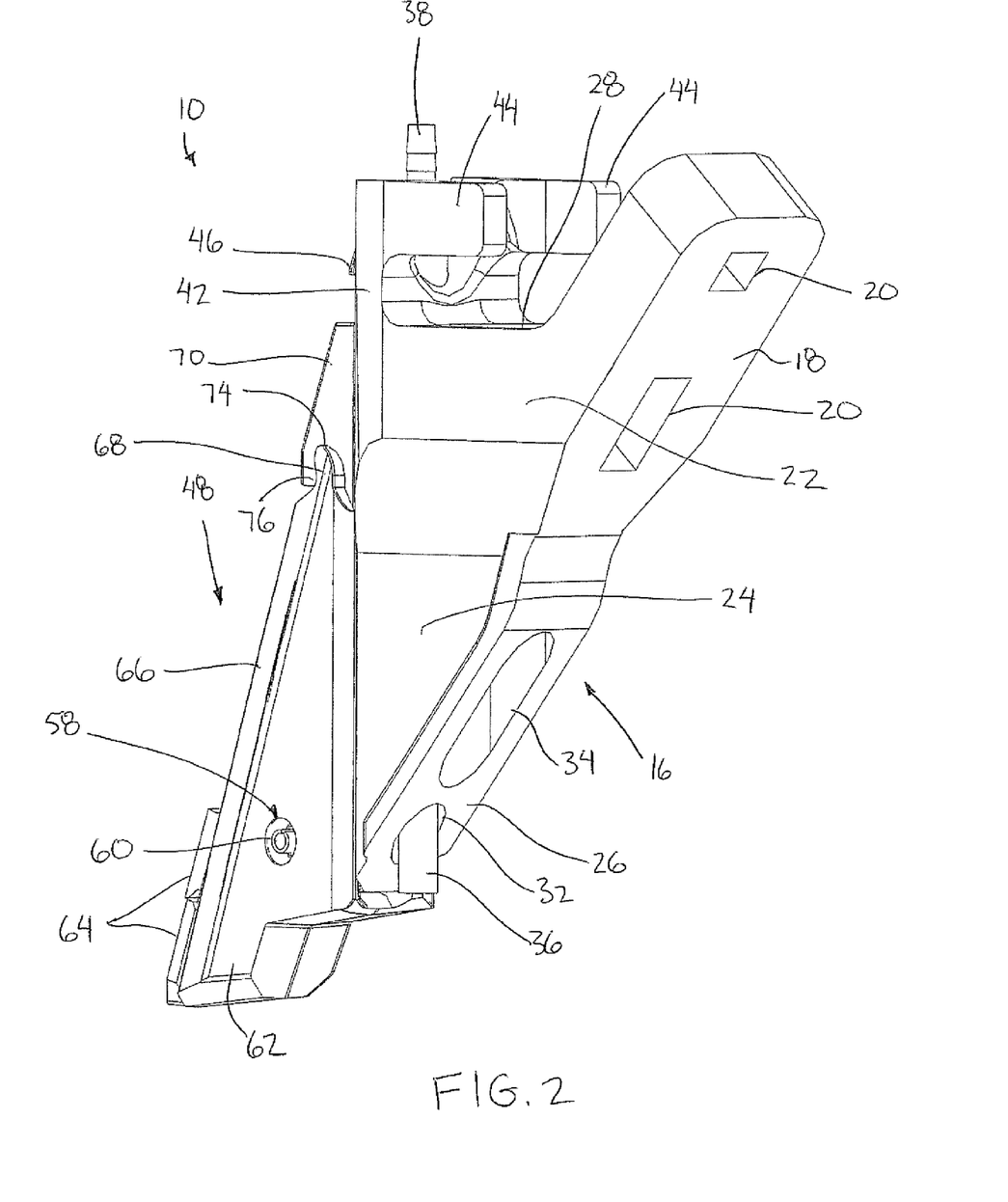
FIG. 2 is a perspective view of a rear side of the furrow opener according to FIG. 1.
Figure 3:
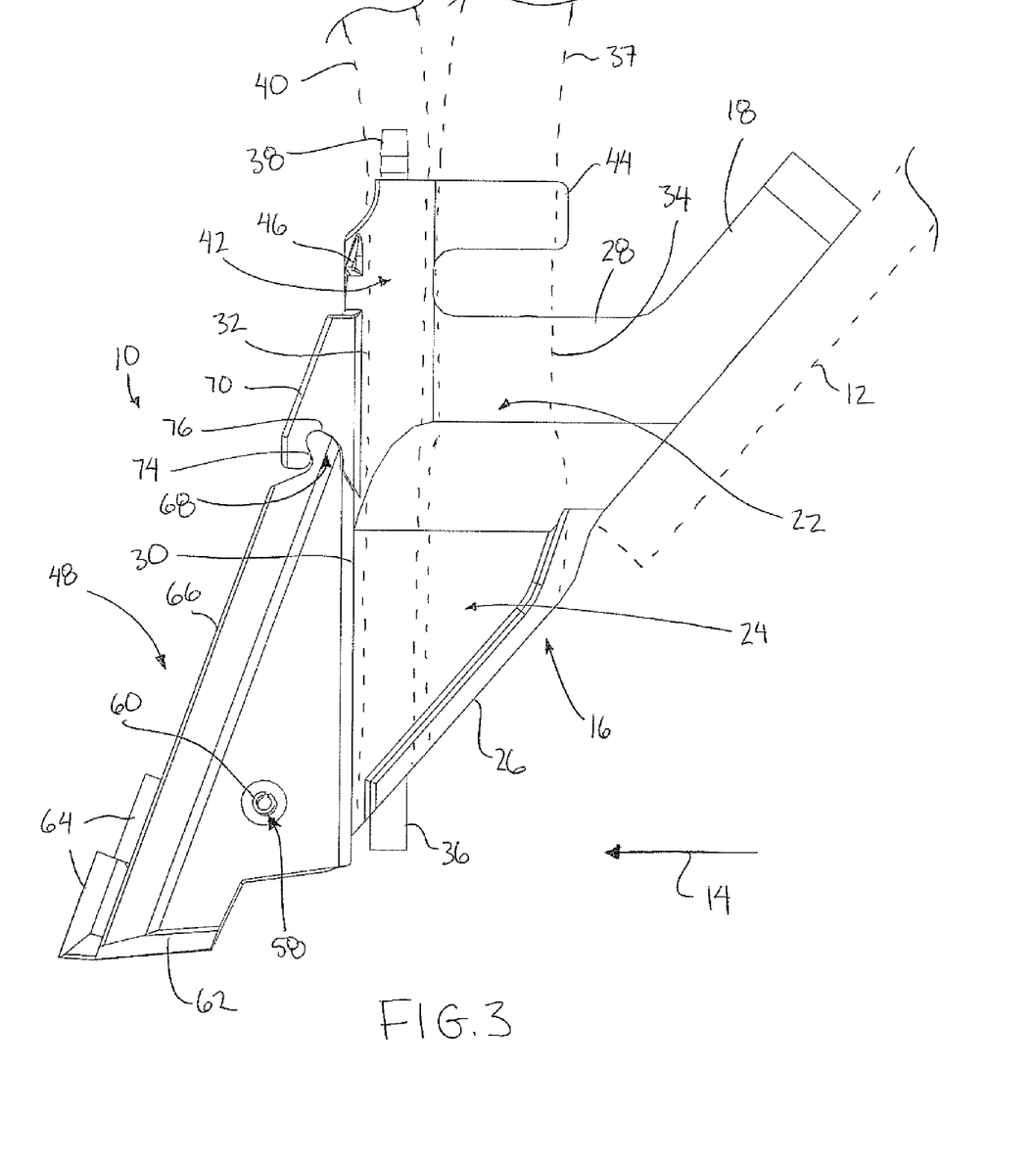
FIG. 3 and FIG. 4 are side elevational and top plan views respectively of the furrow opener according to FIG. 1
Figure 4:
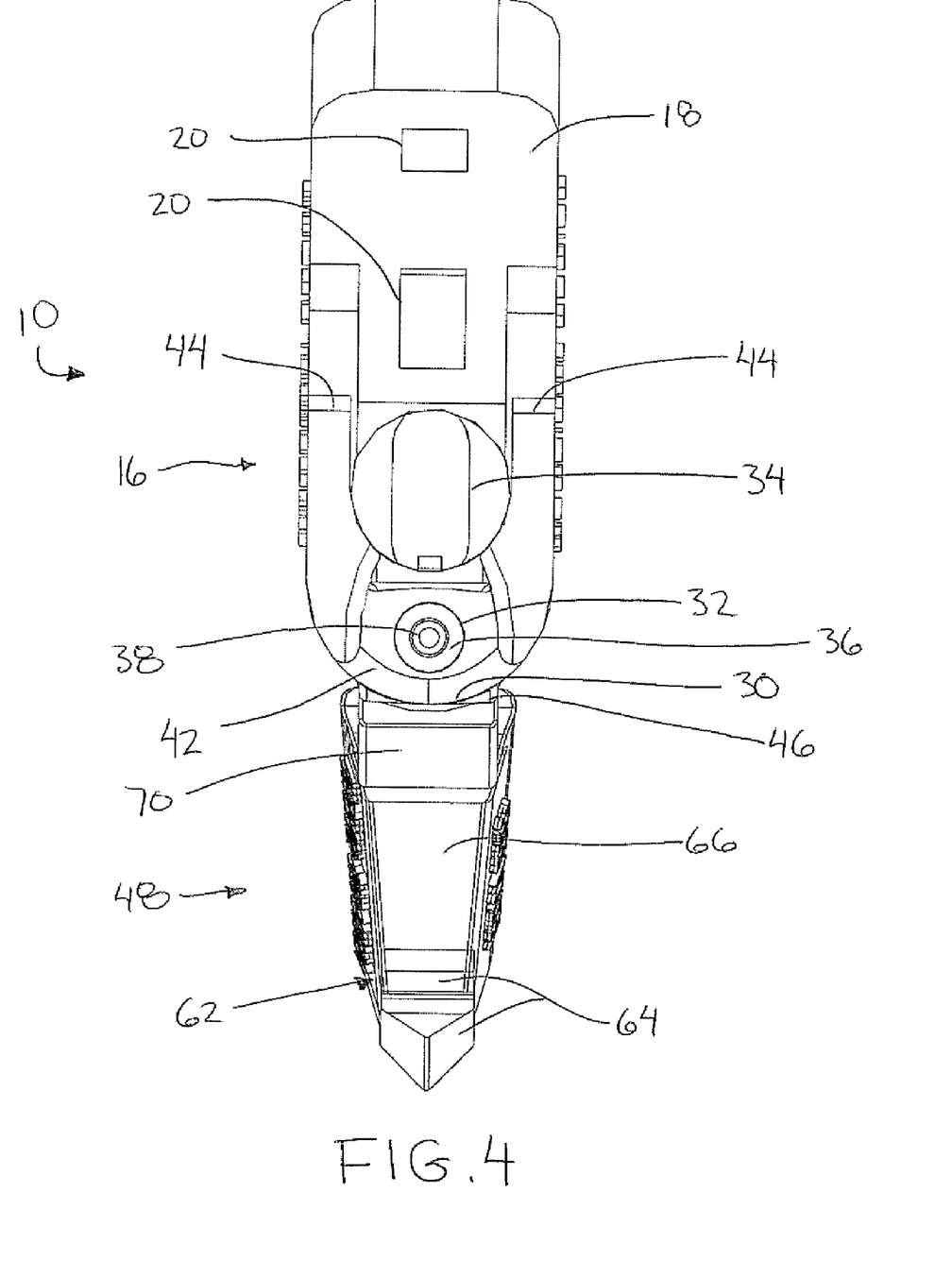
Figure 5:
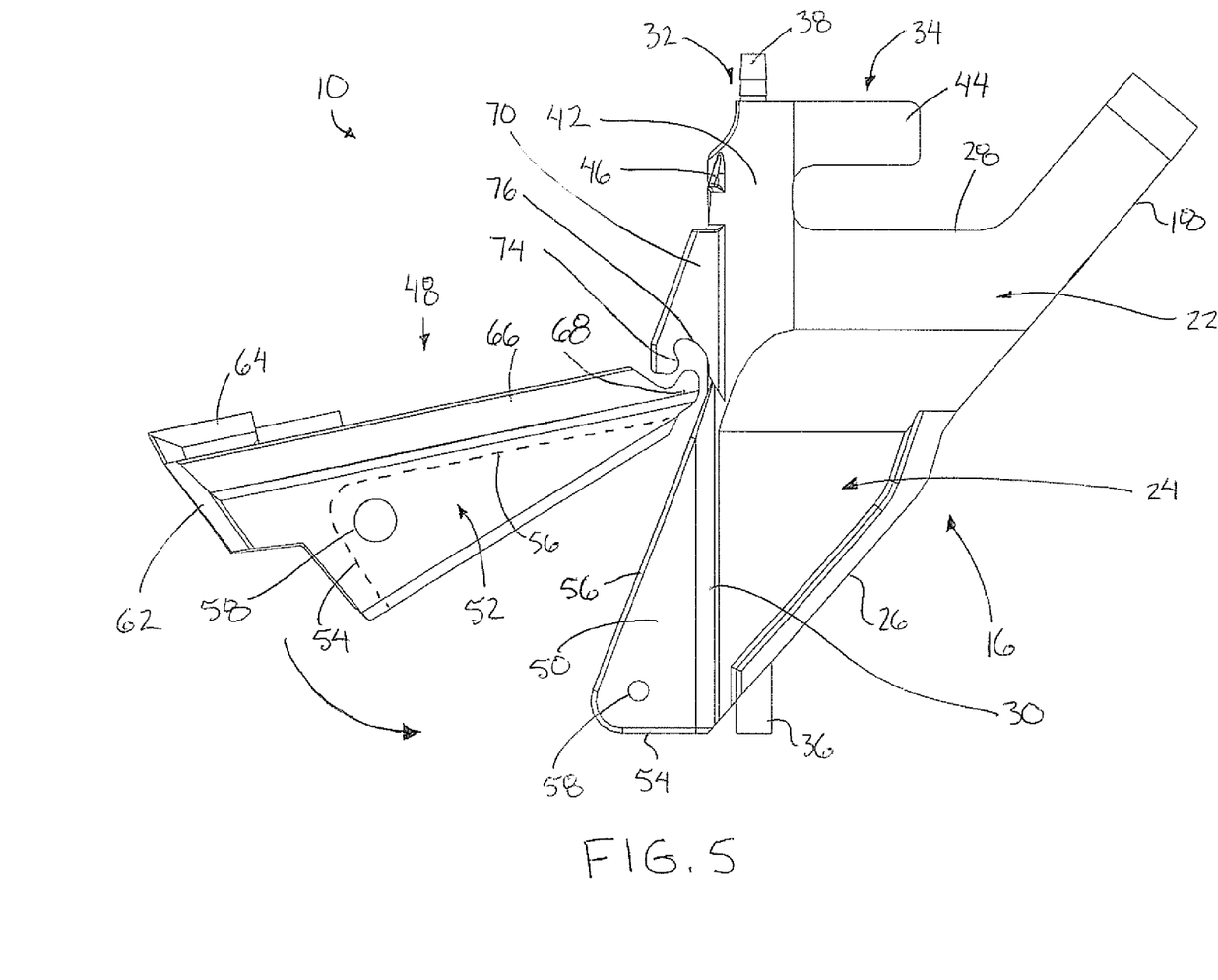
FIG. 5 is a side elevational view of the furrow opener of FIG. 1 in which the tip body is shown partially separated from the opener body.

As shown in FIG. 5, to mount the tip body onto the opener body, the upper connecting portion 68 is first aligned with the gap in the retainer member to be inserted therein. The front side of the tip body is near horizontal in orientation during insertion of the upper connecting portion 68 into the retainer member. Once the upper connecting portion is aligned with the retainer member, rotating the furrowing portion spaced below the retainer member downwardly and rearwardly towards the bottom end of the opener body causes the protrusion of the front connecting portion of the opener body to be received and aligned with the socket forming the rear connecting portion in the tip body.

The generally horizontal orientation of the front and rear connecting portions readily permits the tip body to the rotated into its mounted position shown in FIGS. 1 through 4. Once the front and rear connecting portions are mated, the retainer pin is received through the cooperating apertures to retain the tip body on the opener body. In this position the upper connecting portion 68 is mated with the retainer member at a location spaced above the mating connecting between the front and rear connecting portions. The retainer member serves to provide force in the rearward direction applied to the tip body to retain the tip body against the front side of the opener body during furrow formation to counter the forces of the ground against the furrowing portion at the bottom end of the tip body which push rearwardly on the furrowing portion and cause a moment to be applied to the mating front and rear connecting portions between the tip body and the opener body.

Figure 6:
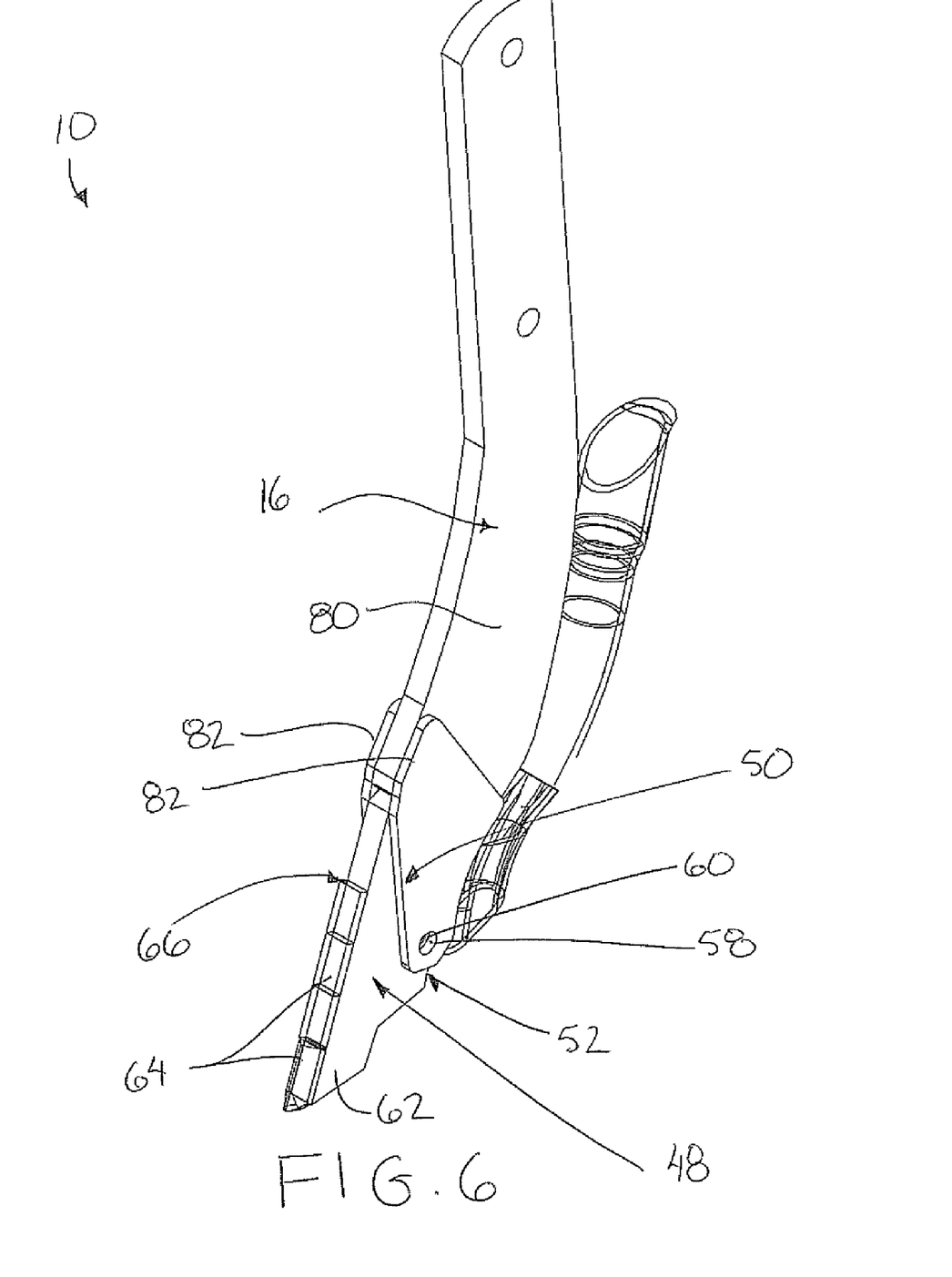
FIG. 6 is a perspective view of a second embodiment of the furrow opener.
Figure 7:
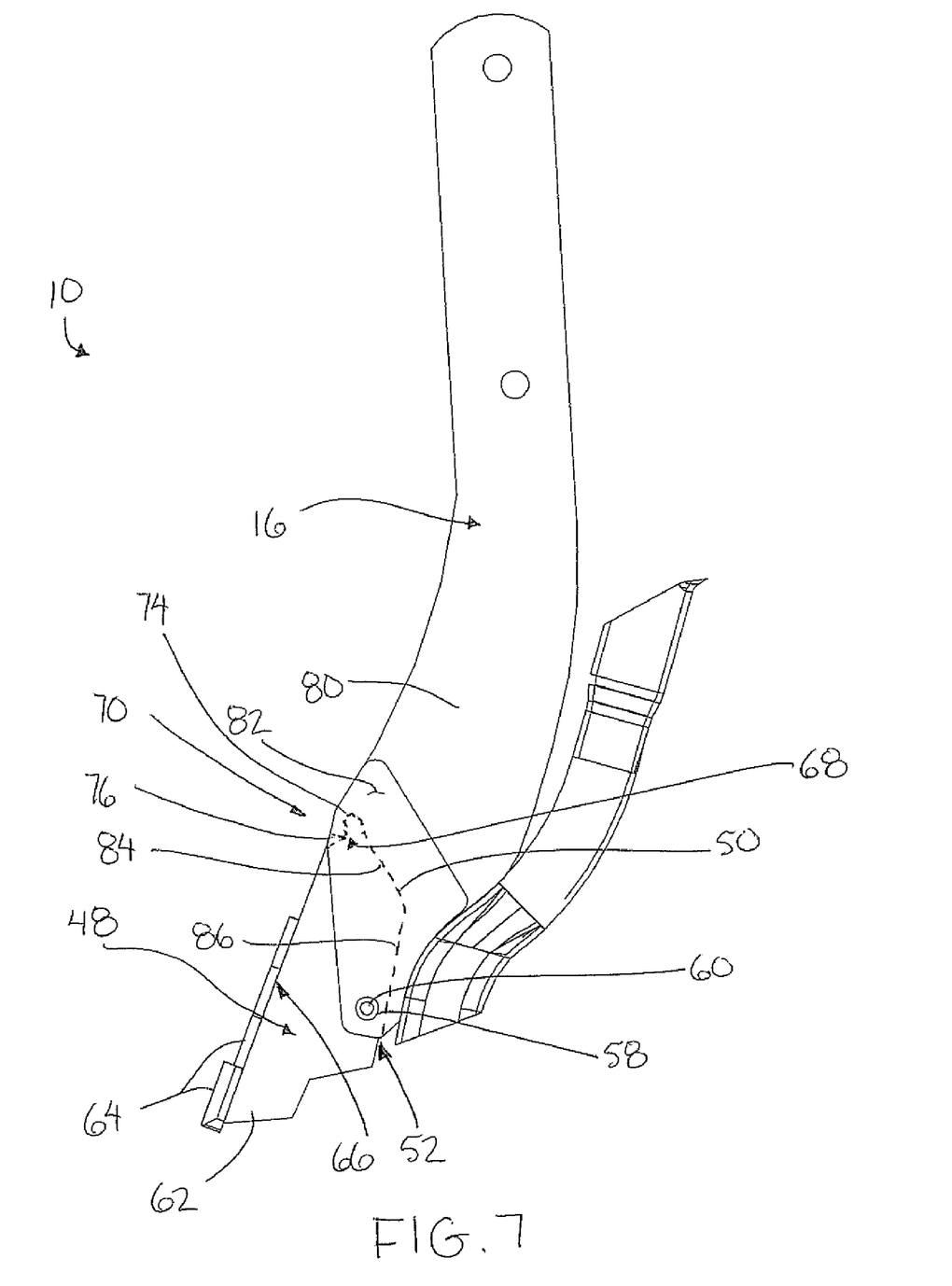
FIG. 7 is a side elevational view of the furrow opener according to FIG. 6.

As shown in the second embodiment of FIGS. 6 and 7, the opener body 16 includes a socket like formation adjacent the bottom end at the front side thereof for receiving a portion of the tip body 48 therein. The rear connecting portion 52 of the tip body in this instance also serves to mount the rear side of the tip body adjacent the bottom end thereof to the bottom end of the opener body primarily by the use of cooperating apertures 58 in the tip body and the opener body as in the previous embodiments. The retainer pin 60 received through the apertures permits the tip body to remain readily releasable from the opener body as described above. In the embodiment of FIGS. 6 and 7, the retainer member 70 also includes a similar function as described above with regard to the previous embodiment in that the retainer member again extends downwardly and forwardly over the top front edge of the tip body at a location spaced above the furrowing portion 62 of the tip body and spaced above the retainer pin 60 received through the cooperating apertures 58 which primarily define the rear connecting portion of the tip body.

As illustrated in FIGS. 6 and 7, the opener body comprises a main body portion 80 in the form of a vertical plate which is elongate in an upright direction and orientated to be parallel to the forward working direction. An upper end of the main portion 80 includes mounting apertures therein for securement to an implement shank of an agricultural cultivator. The front connecting portion 50 at the bottom end thereof comprises two side walls 82 comprising plates mounted parallel to the main portion 80 on opposing sides thereof to project downwardly and forwardly beyond the bottom end of the main portion. A space defined between the two side walls 82, forwardly of the main portion 80, receives a rear portion of the tip body therein which locates the aperture 58 of the rear connecting portion of the tip body for alignment with the corresponding apertures 58 in the two side walls 82 adjacent the bottom end of the walls, spaced forwardly of the main portion 80 of the opener body.

The tip body 48 in this instance also comprises a vertical plate oriented parallel to the forward working direction and having a width which is approximately equal to the width of the main portion 80 of the opener body. Accordingly the tip body fits between the side walls 82 forming the front connecting portion 50 of the opener body with a close tolerance therebetween. A rear edge of the tip body includes an upper portion 84 which is sloped downwardly and rearwardly from the top end of the opener body and a lower portion 86 which is sloped downwardly and forwardly from the bottom end of the upper portion 84. The aperture 58 of the rear connecting portion 52 is located in alignment with the lower portion 86 of the rear edge. The leading edge of the main portion 80 of the opener body between the two side walls 82 follows the profile of the upper and lower portions of the rear edge of the tip body for mating engagement therewith. Accordingly the leading edge of the main portion of the opener body between the two side walls similarly includes an upper portion sloped downwardly and rearwardly and a lower portion sloped downwardly and forwardly.

As shown in FIGS. 6 and 7, the tip body 48 also includes a furrowing portion 62 which extends downwardly and forwardly beyond the bottom end of the opener body for forming a furrow in the ground. Wear resistant material 64 is secured to the front edge of the furrowing portion for engaging the ground. Similarly to the previous embodiment, the front edge of the tip body extends continuously upward from the furrowing portion 62 to the top end along a continuous upward and rearward incline to define the guard portion 66 of the tip body extending upwardly to the top end.

At the top end of the tip body, the upper connecting portion 68 is formed similarly to the previous embodiment to extend upwardly beyond the top end of the tip body spanning the full width of the tip body and being somewhat curved upwardly and forwardly for being matingly received within the gap defined by the depending portion 74 of the retainer member 70 spaced forwardly of the corresponding leading edge of the opener body which mates with the rear edge of the tip body. As shown in FIGS. 6 and 7, the retainer member is received between the two side walls 82 of the main portion of the opener body such that opposing ends of the gap formed between the depending portions 74 of the retainer member and the remainder of the opener body are enclosed by the two side walls respectively.

The retainer member 70 of FIGS. 6 and 7 is formed similarly to the previous embodiment in that the retainer member is located above the sloped edges of the opener body that mate with the rear edges of the tip body. Furthermore the retainer member comprises the first portion 76 extending forwardly from the main portion of the opener body to the depending portion 74 extending downwardly from the front edge of the first portion 76 to be sloped somewhat rearwardly. The retainer member thus comprises a hook like formation extending downwardly overtop of the front side of the upper connecting portion of the tip body to adequately secure the top end of the tip body against the opener body.

The formation of the upper connecting portion and the retainer member cause the tip body to be mounted onto the opener body in a similar manner as the previous embodiment in which the upper connecting portion is first aligned with the downward facing opening formed by the retainer member prior to alignment of the aperture 58 of the rear connecting portion with the corresponding aperture of the opener body. Once the upper connecting portion is aligned with the retainer member, the furrowing portion is rotated downwardly and rearwardly towards the bottom end of the opener body to align the apertures 58 so that the rear connecting portion of the tip body can be connected to the opener body in a releasable manner by the retainer pin 60 subsequent to the independent coupling of the upper connecting portion with the retainer member.

In the embodiment of FIGS. 6 and 7, a single product delivery passage is provided in the form of a tube extending downwardly and forwardly along the rear side of the opener body for communication with a suitable product delivery tube of the agricultural cultivator upon which the opener is mounted.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A furrow opener for mounting on an agricultural implement shank for movement therewith in a forward working direction, the furrow opener comprising:
   an opener body including a shank mount arranged to support the opener body on the implement shank and a forward connecting portion;
   a tip body comprising:
      a rear connecting portion at a rear side of the tip body arranged for connection to the forward connecting portion of the opener body so as to couple the tip body to the opener body adjacent a bottom end of the opener body;
      a furrowing portion extending downwardly and forwardly from the rear connecting portion beyond the bottom end of the opener body so as to be arranged to form a furrow in the ground;
      a guard portion extending upwardly from the furrowing portion along a front side of the opener body;
      an upper connecting portion comprising a hook member extending upwardly and forwardly from a top end of the opener body;
      the upper connecting portion being spaced above the rear connecting portion; and
   a retainer member supported on the opener body adjacent a top end of the tip body such that the upper connecting portion of the tip body above the rear connecting portion is arranged to be received between the retainer member and the opener body adjacent the top end of the tip body;
   the retainer member comprising a depending portion extending downwardly and rearwardly in mating engagement over the upper connecting portion of the tip body ahead of the opener body such that the upper connecting portion of the tip body is arranged to be inserted between the depending portion of the retainer member and the opener body by rotating the furrowing portion of the tip body downwardly and rearwardly towards the bottom end of the opener body; and
   the rear connecting portion of the tip body and the forward connecting portion of the opener body being shaped so as to be arranged for mating connection subsequent to alignment of the upper connecting portion with the retainer member as the furrowing portion is rotated downwardly and rearwardly towards the bottom end of the opener body.

2. The opener according to claim 1 wherein the retainer member is spaced upwardly above the furrowing portion of the tip body.

3. The opener according to claim 1 wherein the retainer member is formed integrally with the opener body.

4. The opener according to claim 1 wherein the rear connecting portion comprises an aperture formed in the tip body in alignment with an aperture in the opener body and wherein there is provided a retainer pin extending transversely to the forward working direction through the apertures in the tip body and the opener body, the retainer member being spaced above the retainer pin.

5. The opener according to claim 1 wherein the tip body is elongate in an upright direction.

6. The opener according to claim 1 wherein one of the forward and rear connecting portions comprises a socket and the other one of the connecting portions comprises a protrusion matingly received within the socket.

7. The opener according to claim 6 wherein a bottom wall of the socket is substantially horizontal.

8. The opener according to claim 6 wherein the rear connecting portion of the tip body comprises the socket and the forward connecting portion of the opener body comprises the protrusion.

9. The opener according to claim 1 wherein the top end of the tip body is similar in elevation to a bottom end of the shank mount on the opener body.

10. The opener according to claim 1 wherein the tip body spans upwardly from the bottom end of the opener body a majority of an overall height of the opener body.

11. The opener according to claim 1 wherein there is provided at least one product delivery passage through the opener body rearward of the tip body.

12. The opener according to claim 11 wherein said at least one product delivery passage extends through the opener body forwardly of the shank mount.

13. The opener according to claim 1 wherein there is provided two product delivery passages extending through the opener body rearwardly from the tip body, one of the delivery passages being arranged for communication with a liquid fertilizer delivery tube and one of the delivery passages being arranged for communication with a seed delivery tube.

14. The opener according to claim 13 wherein both product delivery passages extend through the opener body forwardly of the shank mount.

15. The opener according to claim 1 wherein the forward connecting portion comprising a pair of upright side walls supported spaced apart from one another to extend in the forward working direction, the rear connecting portion comprising a rearward portion of the tip body which is received between the upright side walls of the opener body.

16. The opener according to claim 15 wherein the retainer member is located between the upright side walls of the opener body.

17. The opener according to claim 1 wherein the tip body comprises a plate member arranged to be supported parallel to the forward working direction.

18. The opener according to claim 1 wherein the hook member spans a full width of the tip body in a lateral direction.

19. The opener according to claim 1 wherein the hook member is curved in profile such that a front face of the hook member is concave and a rear face of the hook member is convex.

20. A method of mounting a tip body on an opener body of a furrow opener in which the opener body comprises a shank mount arranged to support the opener body on an agricultural implement shank for movement therewith in a forward working direction, and in which the tip body comprises a rear connecting portion coupling the tip body to the opener body adjacent a bottom end of the opener body, a furrowing portion extending downwardly and forwardly from the rear connecting portion beyond the bottom end of the opener body, and a guard portion extending upwardly from the furrowing portion along a front side of the opener body, wherein there is provided a forward connecting portion on the opener body connected to the rear connecting portion of the tip body so as to be readily releasable, one of the connecting portions comprising a socket and the other one of the connecting portions comprising a protrusion matingly received within the socket; the method comprising:

providing a retainer member supported on the opener body adjacent a top end of the tip body spaced above the rear and forward connecting portions;

aligning an upper connecting portion of the tip body above the rear connecting portion with the retainer member on the opener body;

inserting the upper connecting portion of the tip body between the retainer member and the opener body adjacent the top end of the tip body by rotating the furrowing portion downwardly and rearwardly towards a bottom end of the opener body; and mating the forward connecting portion and the rear connecting portion as the furrowing portion is rotated downwardly and rearwardly towards the bottom end of the opener body subsequent to alignment of the upper connecting portion of the tip body with the retainer member on the opener body.

\* \* \* \* \*